Nov. 12, 1929.   J. W. MARTIN, JR   1,735,832
REFRIGERATED PACKAGE WITH PERMEABLE INSULATION AND METHOD
Original Filed April 2, 1927

INVENTOR
James W. Martin, Jr.
BY
his ATTORNEY

Patented Nov. 12, 1929

1,735,832

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

REFRIGERATED PACKAGE WITH PERMEABLE INSULATION AND METHOD

Application filed April 2, 1927, Serial No. 180,410. Renewed April 12, 1929.

My present invention is related to that of Ser. No. 180,411, of even date, in that it concerns improvements relating to the use of frozen carbon dioxide enclosed in a package with perishable products of types not injured by over-freezing. The package may be used for ordinary storage or for transportation of the goods as, for instance, in Slate Patent No. 1,595,436, granted August 10th, 1926, but my present invention concerns more particularly the embodiment in a package for such purposes, of principles of insulation and control of sublimating of the frozen carbon dioxide, by control of flow of the gaseous product in ways specifically different from those of said patent and from those of said application.

In the present case, the frozen carbon dioxide is usually in the form of dense, highly compressed blocks which, as is well known, do not melt to a liquid under atmospheric conditions, but sublimate directly to carbon dioxide gas. The freezing temperature of the carbon dioxide is approximately 114° F. below zero, but the effective temperature of the gas sublimating from the solid, under atmospheric conditions, is higher, say 85° below zero. Because the carbon dioxide molecule ($CO_2$) is intrinsically much heavier than either the oxygen or nitrogen constituent of the air and because of its very low temperature, the gas thus evolved is almost twice as heavy as air at ordinary refrigerator temperatures. Consequently, the gas readily displaces air, tends to remain in the bottom of a receptacle and will diffuse but slowly. My present method utilizes these characteristics. Because of its great molecular weight and because it is perfectly anhydrous, the gaseous product is a phenomenally good insulator.

In the present case, the perishable product is preferably enclosed in a water-tight container, preferably of metal, preferably with the frozen carbon dioxide in direct contact with the metal. The perishable product and the frozen carbon dioxide are enclosed together in a bag the upper end or mouth of which is not sealed and so affords a possible path for escape of the gas.

As in my prior application, where a bag is used, the freshly evolved gas will flow downward in the bag around the container, displacing air and warmer gas upward, thus refrigerating the perishable product and filling the interspaces within the bag with effectively insulating gas.

The nature of the bag used and the principles involved in the present case differ radically from those of said prior application. In said application, the bag is of paper, the thin walls affording almost negligible insulation, the insulation in that case being effected by control of the flow of gas first about the perishable product within the bag, then outside the bag by a specially formed outer container. In the present case, the bag combines analogous functions in itself. Bags suitable for my purpose are obtainable in the market, consisting of inner and outer layers of canvas, with felt, hair, wool or the like quilted between the layers to a very substantial thickness. The canvas iteslf is more or less waterproof, but it is not gas proof. The perishable product, as for instance, ice cream in an ordinary metal can is preferably in super-frozen condition. When the mouth of the bag is closed and secured by folding over well fitting flaps, circulation of air is excluded quite effectively and the bag itself will serve to protect the ice cream for short-distance transportation from factory to retailer, but my invention includes enclosing in the bag with the ice cream container, a quantity of frozen carbon dioxide for the purpose of evolving within the bag during the journey, a continuous supply of dry, cold carbon dioxide gas. In practice, it will be found that the flap closure for the mouth of the bag fits tight enough so that much, if not all, of the carbon dioxide gas will be forced through the canvas into the hair or felt. A continuous ooze of the gas not only displaces the air, replacing it with highly insulating gas, but it maintains a continuous outward flow at a rate, which for any one point in the bag is extremely slow, yet is sufficient to act as a convection current carrying the heat outward as distinguished from, and in addition to, serving as dead insulation opposing heat conduction.

The above and other features of my invention will be more evident from the following description in connection with the accompanying drawings, in which Fig. 1 is an elevation partly in perspective of a bag with the mouth flaps open;

In these drawings the bag is shown as made of hair felt, 1, protected by an outer layer of fabric, 2, and an inner layer of fabric, 3, preferably quilted or stitched as at 4. The fabric is preferably canvas which, under ordinary conditions of use, is practically waterproof, but under conditions of use in accordance with my present invention, it is not gas-tight. While I prefer good quality hair felt as the insulating material to be quilted between the canvas covers, it is evident that wool or any other desired heat insulating material, particularly such as afford air interspaces, may be employed.

Figure 1:
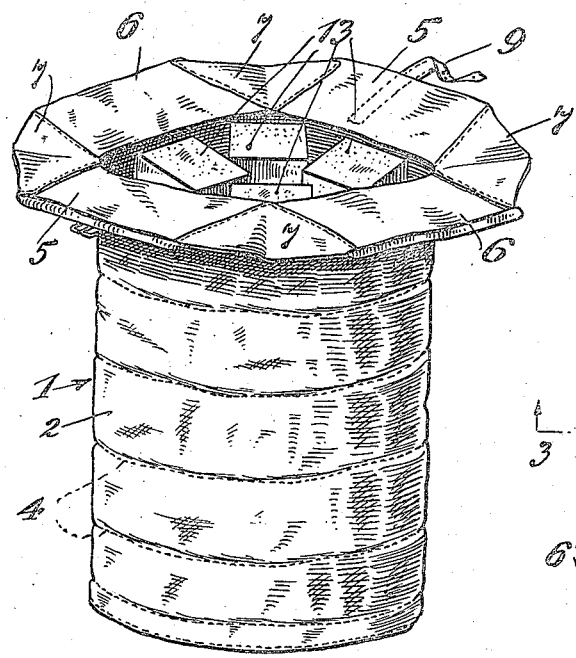
Figure 2:
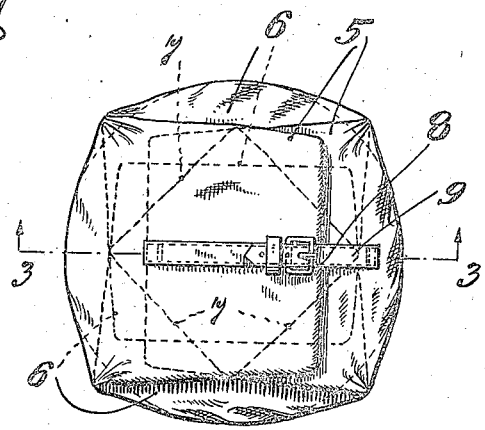
Fig. 2 is a top plan view of the bag closed.
Figure 3:
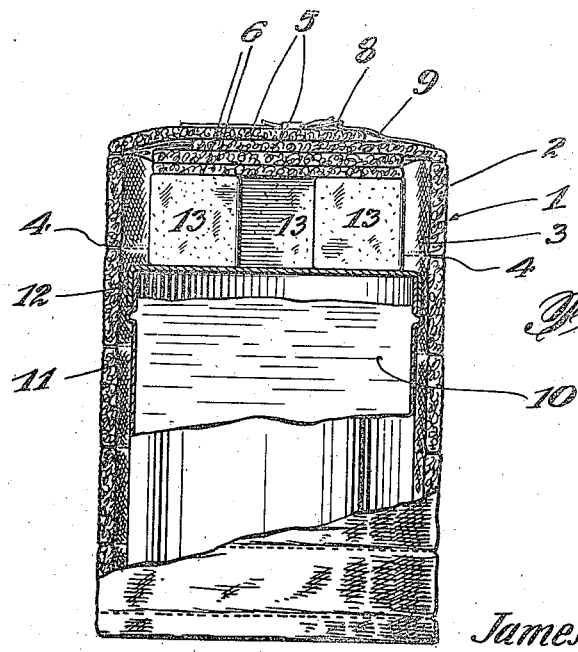
Fig. 3 is a vertical section on the line 3—3, Fig. 2.

The bag is shown as approximately cylindrical and the mouth thereof is formed with flaps 5, 5 and 6, 6, preferably rectangular and in opposite pairs, as shown. Adjacent edges of adjacent flaps are preferably connected by webs 7, 7, 7, 7, preferably a single layer of canvas in order to facilitate flexing on closure of the bag. The bag is closed by folding over opposite flaps, as 6, 6, and then, over them, flaps 5, 5, as shown in Fig. 3. The outer pair of flaps as 5, 5, are provided with securing means as, for instance, a strap with buckle 8 on one flap and a strap, 9, on the other flap to engage with the buckle.

The perishable product to be shipped in the bag as, for instance, frozen or superfrozen ice cream, 10, may be enclosed in a container 11, provided with a suitable cover, 12. In the case of relatively large shipments as, for instance, 5 gallons or more of ice cream, for which my invention is particularly adapted, the container, 11, is preferably of metal and may be either heavy metal such as would be returned to the shipper for re-use, or it may be a cheaper, throw-away metal container such as is sometimes used for such purposes.

Cakes of carbon dioxide ice 13, 13 are placed on the cover 12 of the container and are held in position by the folded flap, as indicated in Fig. 3. As shown, the cakes are cubes, but when these are molded from carbon dioxide snow in a hydraulic press, it is entirely practical to make a single cylindrical cake adapted to fit the cover. It will be understood that a single cake will last longer, whereas the subdivided cakes will melt faster on account of their greater surface area per unit volume.

The heavy carbon dioxide gas evaporating from the ice cake or cakes 13, naturally tends to flow downward in the bag, displacing the air upward and thereafter displacing the warmer carbon dioxide gas which, it will be understood, is warmer only by comparison with the fresh gas, both being in fact intensely cold. Thus the refrigerative values of the refrigerant are first applied to the container 11 and its contents to over-freeze the latter, thus conserving and so as to speak, storing up refrigerative values in the mass of the ice cream, against a possible time of need. The gas also affords extremely effective gaseous insulation for both the carbon dioxide ice and the container. All air being displaced, the ice is protected from sublimating because the partial pressure of the carbon dioxide gas atmosphere in contact with it, is so much greater than that of air. The sublimating point is correspondingly lowered.

The freshly evolved carbon dioxide gas is perfectly dry and has a great affinity for moisture. Consequently, it has a remarkable drying effect on the inner layer of canvas. Consequently, although the canvas may be substantially waterproof under ordinary atmospheric conditions, it is soon dried perfectly and becomes sufficiently permeable to permit oozing out of the gas through the canvas lining into the felt or hair and to the outer canvas cover. The great weight of the cold carbon dioxide gas, nearly twice that of atmosphere, plus such back pressure as may be applied by the tightly folded flaps, insures penetration and oozing out of the gas into the hair and felt with the above described drying effect on the latter, within a relatively short time. Such perfect drying of the material of the bag is alone sufficient to greatly increase its insulating quality and employment of even a small quantity of frozen carbon dioxide, for this purpose alone would be justified, even disregarding the refrigerative values of the ice.

As a matter of fact, however, I prefer to employ substantial amounts of the frozen carbon dioxide and to have it in the highly compressed or ice form so that under the conditions of use, and with the ice cream properly frozen, preferably super-frozen, before packing in the bag, the frozen carbon dioxide will last for a journey of 24 to 36 hours or more.

From the above, it will be seen that as a result of my invention, the insulating quality of the bag is greatly increased both by complete drying of the materials of the bag, by the substitution of a heavy inner gas for relatively light air and by the continuous oozing of the gas operating to keep the interspaces perfectly dry and by its outward ooze to carry outside of the bag the inleaking heat. In addition to the above important insulating effects, substantial amounts of frozen carbon dioxide can be used for its refrigerating effect, it being nearly twice the weight of water ice per unit volume and of nearly twice the refrigerative effect per unit weight. Thus, for a given space taken up in the bag by frozen carbon dioxide, I attain nearly four times the refrigerative value that would result from the same space filled with water ice cakes, supposing that water ice could be used. Obviously, it cannot be used, because the water ice melts to a liquid, whereas the carbon dioxide ice sublimates directly to anhydrous gas, as above explained.

While the container 11 can be made of cheap throw-away material, even for considerable quantities of ice cream, 5 gallons or more, and while the bag could doubtless be made of relatively cheap materials, I prefer to employ the best quality hair felt, making a substantial bag of fine insulating quality and therefore so expensive that for shipments of ordinary commodities like ice cream, the bag must be returned to the shipper for reuse. It will be obvious, however, that even though returned, the bag is light and can be folded in small compass so that the return transportation charge will be small.

As in the prior patent to Slate referred to above, the expressions "solid carbon dioxide", "frozen carbon dioxide", etc., are used as shorthand description of a solidified mass of an inert substance which at ordinary temperatures is a gas heavier than air and which on absorption of heat passes directly from the solid to the gaseous state. Hence it will be understood that such expressions as used in the appended claims are intended to include equivalent solid substances as, for instance, frozen carbon dioxide with small admixtures of other material that may be present either as impurities or which have been incorporated for special purposes as, for instance, to facilitate the formation of cakes from snow; or to increase the strength or improve the appearance of the cakes or to change the melting point, etc.

I claim:

1. A refrigerated package including a perishable product adapted to be over-frozen, a container enclosing said product, solidified carbon dioxide and a bag in which said container and frozen carbon dioxide are enclosed, with the latter nearest the mouth of the bag, the material of the bag including a thickness of insulating material of loose fibrous quality affording interspaces designed to permit transverse oozing through of gas liberated within the bag.

2. A refrigerated package including a perishable product adapted to be over-frozen, a container enclosing said product, solidified carbon dioxide and a bag in which said container and frozen carbon dioxide are enclosed, with the latter nearest the mouth of the bag, the material of the bag including a thickness of insulating material of loose fibrous quality affording interspaces designed to permit transverse oozing through of gas liberated within the bag and an outer fabric protecting said insulating layer.

3. A refrigerated package including a perishable product adapted to be over-frozen, a container enclosing said product, solidified carbon dioxide and a bag in which said container and frozen carbon dioxide are enclosed, with the latter nearest the mouth of the bag, the material of the bag including a thickness of permeable insulating material affording interspaces designed to permit transverse oozing through of gas liberated within the bag.

4. A refrigerated package including a perishable product adapted to be over-frozen, a container enclosing said product, solidified carbon dioxide and a bag in which said container and frozen carbon dioxide are enclosed, with the latter nearest the mouth of the bag, the material of the bag including a thickness of hair felt, so that said material is accessible to and permits oozing through of gas evolved from the frozen carbon dioxide for the purpose described.

5. A refrigerated package including a perishable product adapted to be over-frozen, a container enclosing said product, solidified carbon dioxide and a bag in which said container and frozen carbon dioxide are enclosed, with the latter nearest the mouth of the bag, the material of the bag including a thickness of hair felt between and protected by inner and outer sheets of fabric, so that said material is accessible to and permits oozing through of gas evolved from the frozen carbon dioxide for the purpose described.

6. A refrigerated package including a perishable product adapted to be over-frozen, a container enclosing said product, solidified carbon dioxide and a flexible casing in which said container and frozen carbon dioxide are enclosed, the material of the casing including a thickness of insulating material of loose fibrous quality, so that said material is accessible to and permits oozing through of gas evolved from the frozen carbon dioxide for the purpose described.

7. A refrigerated package including a perishable product adapted to be over-frozen, a container enclosing said product, solidified carbon dioxide and a flexible casing in which said container and frozen carbon dioxide are enclosed, the material of the casing including a thickness of insulating material of relatively open fibrous structure affording relatively large volume interspaces and passages, between and protected by inner and outer sheets of fabric, so that said material is accessible to and permits oozing through of gas evolved from the frozen carbon dioxide for the purpose described.

8. A refrigerated package including a perishable product adapted to be over-frozen, a container enclosing said product, solidified carbon dioxide and a flexible casing in which said container and frozen carbon dioxide are enclosed, the material of the casing including a thickness of insulating material of relatively open fibrous structure affording relatively large volume interspaces and passages, and the casing being formed with a flexible flap closure, so that said material is accessible to and permits oozing through of gas evolved from the frozen carbon dioxide for the purpose described.

9. A refrigerated package including a perishable product adapted to be over-frozen, a container enclosing said product, solidified carbon dioxide and a flexible casing in which said container and frozen carbon dioxide are enclosed, the material of the casing including a thickness of insulating material of relatively open fibrous structure affording relatively large volume interspaces and passages, said material being protected by an outer layer of canvas-like fabric, the casing having a flexible flap closure adapted to fold in face engagement to oppose outflow of gas from the casing, so that said material is accessible to and permits oozing through of gas evolved from the frozen carbon dioxide for the purpose described.

10. A refrigerated package including a perishable product adapted to be over-frozen, a container enclosing said product, solidified carbon dioxide and a flexible casing in which said container and frozen carbon dioxide are enclosed, the material of the casing including a thickness of permeable insulating material between and protected by inner and outer sheets of fabric, the casing having a mouth closure formed and arranged to afford substantial resistance to direct outflow of gas through the mouth of the casing, thereby to promote direct oozing outward, through the material of the casing, of gas liberated therein.

11. A refrigerated package including a perishable product adapted to be over-frozen, a container enclosing said product, solidified carbon dioxide and a flexible casing in which said container and frozen carbon dioxide are enclosed, the material of the casing including a thickness of insulating material of relatively open fibrous structure affording relatively large volume interspaces and passages, between and protected by inner and outer sheets of fabric, the casing having a flexible flap closure with lateral connecting webs adapted to fold in face engagement to oppose outflow of gas from the casing.

12. A refrigerated shipping package, including a perishable product adapted to be over-frozen, a throw-away metal container enclosing said product, solidified carbon dioxide and a felt and fabric bag in which said product and frozen carbon dioxide are enclosed, said fabric and felt being easily permeable for oozing through of gas liberated within the bag.

13. A refrigerated package, including frozen carbon dioxide, a perishable product adapted to be over-frozen, and a felt and fabric bag in which said perishable product and frozen carbon dioxide are enclosed, said fabric and felt being easily permeable for oozing through of gas liberated within the bag.

14. A refrigerated package, including frozen carbon dioxide, a perishable product adapted to be over-frozen, and a container of flexible, permeable material in which said perishable product and frozen carbon dioxide are enclosed, said container being provided with a flap closure with lateral connecting webs adapted, when folded, to oppose escape of gas from the container, said flexible, permeable material being of relatively open fibrous structure to permit escape of said gas by oozing through the material thereof.

15. In a method of refrigerating a perishable product adapted to be overfrozen, the steps of enclosing the product with frozen carbon dioxide in a permeable container, generating carbon dioxide gas to create a pressure in said container, whereby said gas may permeate said container, and heat insulating said product by controlling the rate of permeation.

16. In a method of refrigerating a perishable product adapted to be overfrozen, the steps of enclosing the product with frozen carbon dioxide in a permeable container, generating carbon dioxide gas to create a pressure in said container, whereby said gas may permeate said container, and constantly maintaining an insulating layer of said generated gas adjacent said container.

Signed at New York city, in the county of New York and State of New York, this 31st day of March, A. D. 1927.

JAMES W. MARTIN, Jr.